US012690107B2

(12) United States Patent
Knauss et al.

(10) Patent No.: US 12,690,107 B2
(45) Date of Patent: Jul. 21, 2026

(54) CONFIGURATION FOR A LOAD REGULATION DEVICE FOR LIGHTING CONTROL

(71) Applicant: Lutron Technology Company LLC, Coopersburg, PA (US)

(72) Inventors: Matthew Knauss, Somerville, MA (US); Christopher G. Udall, Plainville, MA (US)

(73) Assignee: Lutron Technology Company LLC, Coopersburg, PA (US)

(*) Notice: Subject to any disclaimer, the term of this patent is extended or adjusted under 35 U.S.C. 154(b) by 0 days.

(21) Appl. No.: 18/941,054

(22) Filed: Nov. 8, 2024

(65) Prior Publication Data

US 2025/0063643 A1 Feb. 20, 2025

Related U.S. Application Data

(63) Continuation of application No. 18/191,480, filed on Mar. 28, 2023, now Pat. No. 12,167,516, which is a (Continued)

(51) Int. Cl.
*H05B 47/18* (2020.01)
*H05B 45/10* (2020.01)
(Continued)

(52) U.S. Cl.
CPC ......... *H05B 45/3725* (2020.01); *H05B 45/10* (2020.01); *H05B 45/24* (2020.01);
(Continued)

(58) Field of Classification Search
CPC .... H05B 45/3725; H05B 45/10; H05B 45/24; H05B 45/37; H05B 45/44; H05B 47/18; H05B 47/19
See application file for complete search history.

(56) References Cited

U.S. PATENT DOCUMENTS 8,963,440 B2 2/2015 Jennings et al.
9,220,133 B2 12/2015 Salvestrini et al.
9,504,112 B1 11/2016 Chin et al.
9,595,880 B2 3/2017 Knode et al.
(Continued)

FOREIGN PATENT DOCUMENTS

CN 104902648 A 9/2015
CN 106576409 A 4/2017
(Continued)

*Primary Examiner* — Renan Luque
(74) *Attorney, Agent, or Firm* — Michael S. Czarnecki; Glen R. Farbanish; Philip N. Smith

(57) ABSTRACT

A load regulation device, such as an LED driver, may be configured to control the intensity of a light source based on an analog control signal and a preconfigured dimming curve. The LED driver may sense a magnitude of the analog control signal and determine a new low-end and/or high-end control signal magnitude that falls outside of the input signal range of the dimming curve. The LED driver may rescale the preconfigured dimming curve according to new low-end and/or high-end control signal magnitudes and dim the light source based on the rescaled dimming curve. Multiple LED drivers controlled by the same analog control signal may communicate with each other regarding the magnitude of the analog control signal sensed by each LED driver, and match their target intensity levels despite sensing different analog control signal. A controller may be provided to coordinate the operation of the multiple LED drivers.

17 Claims, 9 Drawing Sheets

Related U.S. Application Data continuation of application No. 17/391,856, filed on Aug. 2, 2021, now Pat. No. 11,647,575, which is a continuation of application No. 16/865,495, filed on May 4, 2020, now Pat. No. 11,083,056, which is a continuation of application No. 16/034,791, filed on Jul. 13, 2018, now Pat. No. 10,645,769.

(60) Provisional application No. 62/532,753, filed on Jul. 14, 2017.

(51) Int. Cl.

| | |
|---|---|
| ***H05B 45/24*** | (2020.01) |
| ***H05B 45/37*** | (2020.01) |
| ***H05B 45/3725*** | (2020.01) |
| ***H05B 45/44*** | (2020.01) |
| ***H05B 47/19*** | (2020.01) |

(52) U.S. Cl.

CPC ............ *H05B 45/37* (2020.01); *H05B 45/44* (2020.01); *H05B 47/18* (2020.01); *H05B 47/19* (2020.01)

(56) References Cited

U.S. PATENT DOCUMENTS

| | | | | |
|---|---|---|---|---|
| 10,149,355 | B2 | 12/2018 | Mosebrook et al. | |
| 10,645,769 | B2 | 5/2020 | Knauss et al. | |
| 11,647,575 | B2 | 5/2023 | Knauss et al. | |
| 2005/0179404 | A1 | 8/2005 | Veskovic et al. | |
| 2013/0313992 | A1 | 11/2013 | Schroder et al. | |
| 2014/0001959 | A1 | 1/2014 | Motley et al. | |
| 2014/0252980 | A1 | 9/2014 | Salvestrini | |
| 2014/0361694 | A1 | 12/2014 | Chen et al. | |
| 2015/0084547 | A1* | 3/2015 | Yeh | H04L 12/2807 315/312 |
| 2015/0195888 | A1 | 7/2015 | Szczerba et al. | |
| 2016/0036349 | A1 | 2/2016 | Steiner et al. | |
| 2017/0238380 | A1 | 8/2017 | Bannister | |
| 2018/0072174 | A1 | 3/2018 | Krammer et al. | |
| 2018/0139818 | A1 | 5/2018 | Coombes et al. | |
| 2018/0160511 | A1 | 6/2018 | Haverlag et al. | |
| 2018/0317306 | A1* | 11/2018 | Harris | H05B 47/10 |

FOREIGN PATENT DOCUMENTS

| | | | |
|---|---|---|---|
| CN | 106717126 | A | 8/2017 |
| WO | 2012109758 | A1 | 8/2012 |
| WO | 2016027060 | A1 | 2/2016 |

* cited by examiner

CONFIGURATION FOR A LOAD REGULATION DEVICE FOR LIGHTING CONTROL

CROSS-REFERENCE TO RELATED APPLICATIONS

This application is a continuation of U.S. patent application Ser. No. 18/191,480, filed Mar. 28, 2023; which is a continuation of U.S. patent application Ser. No. 17/391,856, filed Aug. 2, 2021, now U.S. Pat. No. 11,647,575 issued May 9, 2023; which is a continuation of U.S. patent application Ser. No. 16/865,495, filed on May 4, 2020, now U.S. Pat. No. 11,083,056 issued Aug. 3, 2021; which is a continuation of U.S. patent application Ser. No. 16/034,791, filed Jul. 13, 2018, now U.S. Pat. No. 10,645,769, issued May 5, 2020; which claims priority to U.S. Provisional Patent Application No. 62/532,753, filed Jul. 14, 2017, the entire disclosures of which are incorporated by reference herein.

BACKGROUND

Newer light sources, e.g., high-efficiency light sources, such as light-emitting diode (LED) light sources and compact fluorescent lamps (CFLs), require load regulation devices, such as ballasts or drivers, in order to illuminate properly. The load regulation device usually receives an alternating-current (AC) voltage from an AC power source, and regulates at least one of a load voltage generated across the light source or a load current conducted through the light source. The load regulation device may be configured to control the light output of the light source (e.g., to control the intensity or color of the light source). Example dimming methods may include a pulse-width modulation (PWM) technique, a constant current reduction (CCR) technique, and/or a combination of the PWM technique and the CCR technique. Examples of load regulation devices (e.g., such as LED drivers) are described in greater detail in commonly-assigned U.S. Pat. No. 8,492,988, issued Jul. 23, 2010, entitled CONFIGURABLE LOAD CONTROL DEVICE FOR LIGHT-EMITTING DIODE LIGHT SOURCE, and U.S. Pat. No. 8,680,787, published Mar. 25, 2014, entitled LOAD CONTROL DEVICE FOR A LIGHT-EMITTING DIODE LIGHT SOURCE, the entire disclosures of which are hereby incorporated by reference.

The load regulation device may be configured to control a connected light source (e.g., to adjust the intensity or color of the light source) in response to a control signal. The control signal may be an analog control signal or a digital control signal. The digital control signal may be, for example, a digital PWM control signal, a digital message transmitted using a communication protocol (e.g., a standard protocol, such as the digital addressable lighting interface (DALI) protocol, or a proprietary protocol, such as the ECOSYSTEM protocol), and/or the like. The analog control signal may be, for example, a "zero-to-ten-volt" (0-10V) control signal, a "ten-to-zero-volt" (10-0V) control signal, an analog pulse-width modulated (PWM) control signal, and/or the like. The analog control signal may be transmitted from a remote control device (e.g., an external 0-10V control device). The remote control device may be mounted in an electrical wallbox and may comprise an intensity/color adjustment actuator, e.g., a slider control. The remote control device may regulate a magnitude of the control signal (e.g., regulate a direct-current (DC) voltage level of the control signal) between a low-end magnitude (e.g., zero to one volt) to a high-end magnitude (e.g., nine to ten volts) in response to an actuation of the intensity/color adjustment actuator. The low-end magnitude may correspond to a minimum light level or color temperature of the light source, and the high-end magnitude may correspond to a maximum light level or color temperature of the light source. As the magnitude of the control signal is adjusted between the low-end magnitude and the high-end magnitude, one or more aspects of the light source may be adjusted accordingly. For example, the intensity level of the light output may be adjusted between the minimum light level and the maximum light level according to a dimming curve, the color (e.g., color temperature) of the light output may be controlled according to a color tuning curve, and/or the like.

When the control signal is an analog signal, the magnitude and/or strength of the control signal may be affected by interferences and/or electromagnetic properties of the components located between the remote control device and the load regulation device. For example, long wires that run from the remote control device to the load regulation device may degrade the magnitude of the control signal as received by the load regulation device (e.g., a voltage drop in the magnitude of a 0-10V control signal due to the resistance in the wires). This drop in the magnitude of the control signal may skew the normal dimming range of the light source. For example, instead of receiving a voltage having a magnitude of 1V as a signal to set the light level of the light source to a minimum level, the light source may receive a voltage having a magnitude of 0.8V. Similarly, instead of receiving a voltage having a magnitude of 9V as a signal to set the light level of the light source to a maximum level, the light source may receive a voltage having a magnitude of 8.8V.

The discrepancy between the magnitude of the originally-produced control signal and the actually-received control signal may be particularly noticeable when multiple lighting fixtures are controlled by the same control device but are installed at different distances from the remote control device. For example, the control signal received by one lighting fixture may deviate more or less from the original signal magnitude than that received by another lighting fixture. As such, the same control signal generated by the remote control device may produce different light intensities and/or colors at different lighting fixtures, causing undesirable visual effects in a multi-light environment (e.g., the light output inconsistency may be more perceptible towards the low end of the dimming range).

SUMMARY

A load regulation device is described herein that may be configured to control the intensity and/or color of a light source based on an analog control signal (e.g., such as a 0-10V control signal). The load regulation device may be configured to control, in relation to the analog control signal, the intensity of the light source based on a preconfigured dimming curve and/or the color of the light source based on a color tuning curve. If the load regulation device determines that a magnitude of the analog control signal falls outside of the input signal range of the dimming curve or color tuning curve, then the load regulation device may determine a new low-end control signal magnitude and/or a high-end control signal magnitude. For example, the load regulation device may rescale the preconfigured dimming curve or color tuning curve according to new low-end and/or high-end control signal magnitudes. The load regulation device may adjust the intensity and/or color of the light source based on the rescaled dimming curve or color tuning curve.

A load control system may include multiple load regulation devices that are controlled by the same control device, and as such, are controlled by the same analog control signal. The load regulation devices may communicate with each other regarding the magnitude of the analog control signal sensed (e.g., received) by each load regulation device (e.g., to compensate for variations in the magnitude of the control signal as received by each of the load regulation devices). For example, the multiple load regulation devices may match their target intensity levels despite differences in the magnitude of the analog control signal sensed by the load regulation devices. A controller (e.g., the control device or a separate controller) may coordinate the operation of the multiple load regulation device to achieve consistent light output among the light sources across the range of the control signal.

DETAILED DESCRIPTION

Figure 1:
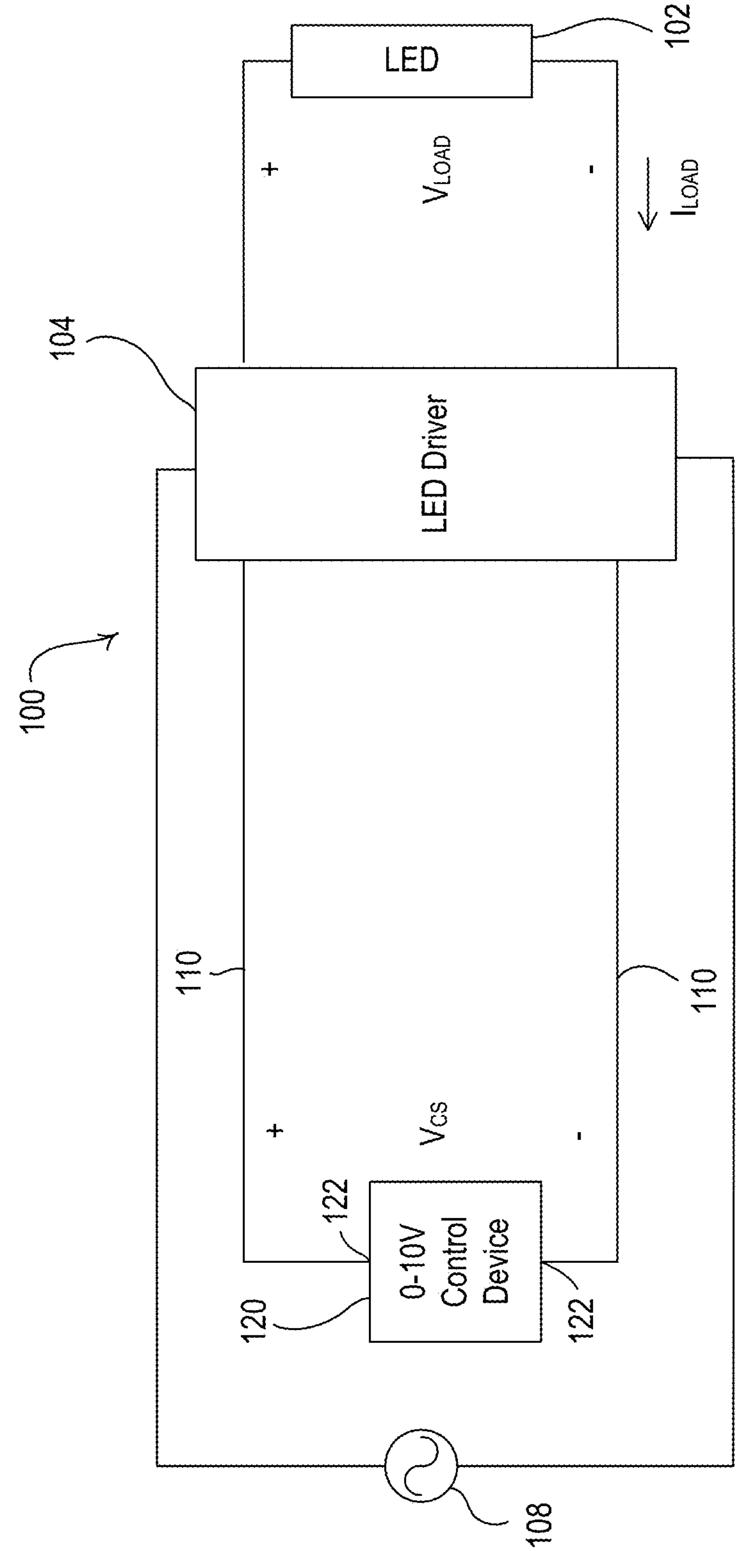
FIG. 1 shows an example load control system in which an LED driver is configured to control the operation of an LED light source based on an analog control input signal.

FIG. 1 is a simplified block diagram of an example load control system 100 for controlling the amount of power delivered to an electrical load, such as a light-emitting diode (LED) light source 102 (e.g., an LED light engine or other suitable lighting load), another type of lighting devices, a motorized window treatment, an HVAC system, and/or the like. The load control system 100 may comprise a load regulation device (e.g., such as an LED driver 104) for controlling an operational characteristic of the LED light source 102, e.g., the intensity and/or the color (e.g., color temperature) of the LED light source 102. The LED driver 104 may be coupled to a power source such as an alternating-current (AC) power source 108 capable of generating an AC line voltage. The LED light source 102 may comprise a single LED, a plurality of LEDs connected in series or parallel or a suitable combination thereof, one or more organic light-emitting diodes (OLEDs), and the like. Further, the power source may comprise a direct-current (DC) power source capable of generating a DC supply voltage for certain electrical loads (e.g., in lieu of or in addition to the AC line voltage).

The load control system 100 may include a load control device 120 (e.g., a 0-10V control device), which may be implemented as a wall-mounted control device or as a remotely-mounted control device (e.g., in a utility closet and/or in a junction box behind a wall or above a ceiling). The load control device 120 may be configured to control the operational characteristic of the LED light source 102 by generating and providing a control signal $V_{CS}$ to the LED driver 104 to control the electrical load in response to a user input. The control signal $V_{CS}$ may comprise, for example, an analog control signal, such as a 0-10V control signal.

The load control device 120 may receive power from the AC power source 108 (e.g., by being connected to the AC power source) or from a different internal or external power source (e.g., as shown in FIG. 1, the load control device 120 may not need to be connected to the AC power source 108). For example, as shown in FIG. 1, the load control device 120 may be powered through the LED driver 104.

The load control device 120 may comprise control terminals 122 adapted to be coupled to the LED driver 104 via control wiring 110. The load control device 120 may comprise a driver communication circuit (e.g., a 0-10V communication circuit, which is not shown in FIG. 1) for generating the control signal $V_{CS}$ (e.g., a 0-10V control signal or a 10-0V control signal). The driver communication circuit may comprise a current sink circuit adapted to sink current through the LED driver 104 via the control wiring 110. The driver communication circuit may also comprise a current source circuit or a current source/sink circuit for generating the control signal $V_{CS}$. As such, the LED driver 104 may be configured to generate a link supply voltage to allow the current sink circuit to generate the control signal $V_{CS}$ on the control wiring 110. The load control device 120 may include a control circuit (not shown) for controlling the current sink circuit to generate the control signal $V_{CS}$ in response to actuations of an intensity adjustment actuator (e.g., a linear slider or a rotary knob). The control circuit may adjust the magnitude of the control signal $V_{CS}$ to have a desired DC magnitude $V_{DES}$ that indicates a target value for an operational characteristic of the LED light source 102 (e.g., the intensity of an LED light source).

The LED driver 104 may be configured to control a magnitude of a load voltage VLOAD developed across the LED light source 102 and/or a magnitude of a load current $I_{LOAD}$ conducted through the LED light source 102. The LED driver 104 may be configured to control the magnitudes of the load voltage VLOAD and/or the load current $I_{LOAD}$ in response to receiving the control signal $V_{CS}$ from the load control device 120 via the control wiring 110. For example, the LED driver 104 may be configured to control the magnitudes of the load voltage VLOAD and/or the load current $I_{LOAD}$ based on preconfigured settings and/or a preconfigured dimming curve. Such a preconfigured dimming curve may depict a relationship between a target intensity $L_{TRGT}$ of the LED light source 102 (e.g., which may correspond to a specific output of the LED driver 104) and the control signal $V_{CS}$. The relationship may be a linear relationship or a square-law relationship, for example.

The LED driver 104 may store data associated with the preconfigured dimming curve in memory (e.g., in one or more look-up tables). Upon receiving the control signal $V_{CS}$, the LED driver 104 may consult the data stored in its memory, and determine the target intensity $L_{TRGT}$ in response to the magnitude of the control signal. For example, in accordance to the preconfigured dimming curve, the LED driver 104 may be configured to set the target intensity $L_{TRGT}$ of the LED light source 102 to a low-end intensity $L_{LE}$ (e.g., approximately 1%) if the received 0-10V control signal has a low-end magnitude $V_{LE}$ (e.g., 1 volt). Similarly, the LED driver 104 may be configured to set the target intensity $L_{TRGT}$ of the LED light source 102 to a high-end intensity $L_{HE}$ (e.g., approximately 100%) if the received 0-10V control signal has a high-end magnitude $V_{HE}$ (e.g., 10 volts). If the received 0-10V control signal has a magnitude between the low-end magnitude $V_{LE}$ and the high-end magnitude $V_{HE}$, the LED driver 104 may set the target intensity $L_{TRGT}$ of the LED light source 102 to a value between the low-end intensity $L_{LE}$ and the high-end intensity $L_{HE}$ based on the dimming curve.

The LED driver 104 may, for example, be configured to adjust the intensity of the LED light source 102 between the low-end intensity $L_{LE}$ and the high-end intensity $L_{HE}$. The LED driver 104 may be configured to adjust the intensity of the LED light source 102 using a constant current reduction (CCR) technique, a pulse-width modulation (PWM) technique, and/or a pulse-frequency modulation (PFM) technique. Additionally or alternatively, the LED driver 104 may be configured to turn the LED light source 102 on and off, to adjust the intensity of the LED light source 102, and/or to adjust the color (e.g., the color temperature) of the LED light source 102.

The magnitude and/or strength of the control signal $V_{CS}$ generated by the load control device 120 may be affected by interferences and/or electromagnetic properties of the components located between the control device 120 and the LED driver 104. For example, the control wiring 110 may degrade the magnitude of the control signal $V_{CS}$ as received by the LED driver 104 (e.g., a voltage drop in the magnitude of the control signal $V_{CS}$ due to the resistance in the wires). The drop in the magnitude of the control signal $V_{CS}$ may affect the operation of the LED driver 104. For example, a user may manipulate the load control device 120 to control the magnitude of the control signal $V_{CS}$ to a magnitude of 1V, intending to set the light level of the LED light source 102 to the low-end intensity $L_{LE}$. Due to signal degradation caused by the control wiring 110, the LED driver 104 may misinterpret the control signal $V_{CS}$, and set the target intensity $L_{TRGT}$ of the LED light source 102 to a value different than intended by the user. For example, when the load control device 120 is generating the control signal $V_{CS}$ to control the LED light source 102 to the low-end intensity $L_{LE}$, the control signal $V_{CS}$ as received by the LED driver 104 may have a magnitude of 0.8V instead of 1V, which may result in "dead travel" during adjustment of the intensity adjustment actuator of the load control device 120 since the LED driver 104 may be unresponsive to the control signal $V_{CS}$ when the magnitude of the control signal $V_{CS}$ is less than 1V (e.g., when the magnitude of the control signal $V_{CS}$ as received by the LED driver 104 is between 0.8V and 1V).

The LED driver 104 may be configured to rescale the dimming curve in response to detecting a magnitude of the control signal $V_{CS}$ that is outside of the range of a stored low-end magnitude $V_{LE}$ and a stored high-end magnitude $V_{HE}$, which represent the end points of the dimming curve. The LED driver 104 may be configured to adjust the intensity of the LED light source in response to the dimming curve as defined by the initial stored low-end and high-end magnitudes $V_{LE}$, $V_{HE}$ when first powered up. The LED driver 104 may be configured to measure the magnitude of the control signal $V_{CS}$ and compare the measured voltage to the low-end and high-end magnitudes $V_{LE}$, $V_{HE}$. If the measured magnitude of the control signal $V_{CS}$ is less than the low-end magnitude $V_{LE}$, the LED driver 104 may update the stored low-end magnitude $V_{LE}$ to be equal to the measured magnitude of the control signal $V_{CS}$ and rescale the stored dimming curve based on the updated low-end magnitude. If the measured magnitude of the control signal $V_{CS}$ is greater than the high-end magnitude $V_{HE}$, the LED driver 104 may update the stored high-end magnitude $V_{HE}$ to be equal to the measured magnitude of the control signal $V_{CS}$ and rescale the stored dimming curve based on the updated high-end magnitude.

The LED driver 104 may be configured to measure the magnitude of the control signal $V_{CS}$ to determine if the magnitude of the control signal $V_{CS}$ falls outside of the range of the stored low-end magnitude $V_{LE}$ and the stored high-end magnitude $V_{HE}$ when first powered up. In addition, the LED driver 104 may be configured to periodically measure the magnitude of the control signal $V_{CS}$ to determine if the magnitude of the control signal $V_{CS}$ falls outside of the range of the stored low-end magnitude $V_{LE}$ and the stored high-end magnitude $V_{HE}$ during normal operation of the LED driver 104. Finally, the LED driver 104 may be configured to be placed into a special calibration mode in which the LED driver 104 may measure the magnitude of the control signal $V_{CS}$ to determine if the magnitude of the control signal $V_{CS}$ falls outside of the range of the stored low-end magnitude $V_{LE}$ and the stored high-end magnitude $V_{HE}$.

Figure 2:
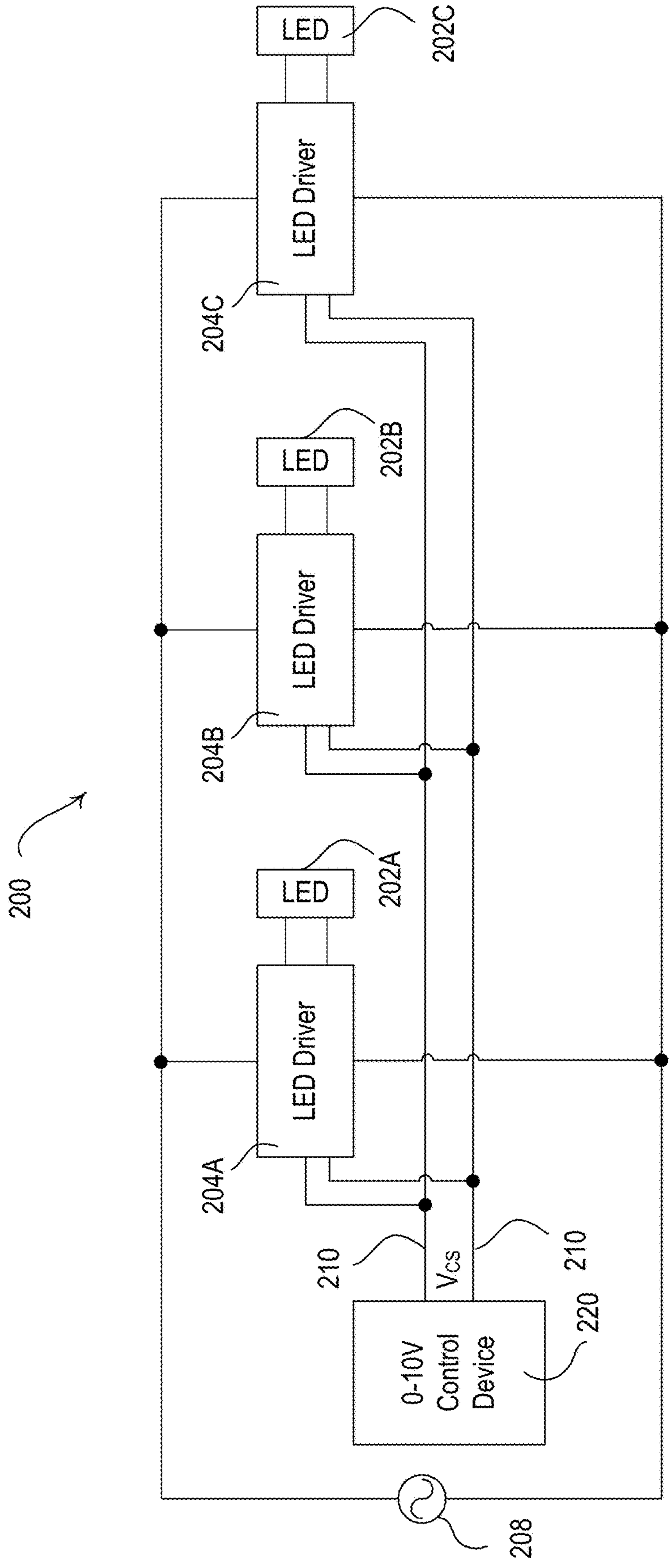
FIG. 2 shows an example load control system comprising multiple LED drivers controlled by a remote control device.

FIG. 2 shows an example load control system 200 comprising multiple LED light sources 202A-202C with respective LED drivers 204A-204C controlled by a remote control device (e.g., a 0-10V control device 220). It should be appreciated that although three LED drivers and respective LED light sources are shown in the figure, the load control system 200 may include any number of LED drivers and respective LED light sources. Further, although described primarily with reference to a 0-10V control signal, it should be appreciated that the load regulation devices (e.g., the LED drivers 204A-204C, etc.) described herein may perform any of the techniques described herein in response to other types of analog control signals.

Each of the LED drivers 204A-204C may be adapted to receive line voltage from an AC power source 208. The LED drivers may be further adapted to be coupled to the 0-10V control device 220 via control wiring 210. The 0-10V control device 220 may receive power from the AC power source 208 (e.g., by being connected to the AC power source). Alternatively or additionally, the 0-10V control device may receive power from a different internal or external power source (e.g., the 0-10V control device 220 may not need to be connected to the AC power source 208). The 0-10V control device 220 may be configured to generate an analog control signal $V_{CS}$ (e.g., a 0-10V control signal) on the control wiring 210 to the multiple LED light sources 202A-202C in response to receiving a user input (e.g., a dimming command).

Since the LED light sources 202A-202C may be installed at different locations, and/or be connected to the 0-10V control device 220 through wirings of different characteristics (e.g., the lengths of the wirings may be different, the electromagnetic properties of the wirings may be different, etc.), the control signal $V_{CS}$ generated by the 0-10V control device 220 may exhibit varying degrees of degradation as received by the respective LED drivers 204A-204C. For example, the 0-10V control device 220 may control the magnitude of the control signal $V_{CS}$ to a preconfigured low-end magnitude (e.g., 1V) in response to a user input to set all of the LED light sources to a low-end intensity $L_{LE}$ (e.g., approximately 1%). Because of the different characteristics (e.g., different resistance) of the wiring between the 0-10V control device 220 and the LED drivers 204A-204C, and/or other electromagnetics conditions, the first LED driver 204A may sense the magnitude of control signal $V_{CS}$ at 1.2V while the second LED driver 204B may sense the magnitude of the control signal at 1.1V. If both of the LED drivers 204A, 204B are configured to respond to the control signal $V_{CS}$ in accordance with a preconfigured dimming curve and are not configured to accommodate the variations in the magnitudes of the control signal $V_{CS}$ as received by the two LED driver 204A, 204B, the light output of the two LED light sources 202A, 202B may be adjusted to different intensity levels, even though the user's intention was to set both light sources to the same intensity level (e.g., the low-end intensity $L_{LE}$).

The LED drivers 204A-204C may be configured to communicate with each other in order to synchronize their dimming curves to ensure that each of the LED light sources 202A-202C is controlled to the same intensity in response to the 0-10V control device 220. The LED drivers 204A-204C may communicate with each other about the measured magnitudes of the control signal $V_{CS}$, and/or about preconfigured intensity levels of the LED drivers that correspond to the measured magnitudes. Based on the communication, the LED drivers 204A-204C may adjust their preconfigured intensity levels (e.g., the LED drivers may rescale respective dimming curves), and control their associated LED light sources 202A-202C accordingly (e.g., based on the rescaled dimming curves). The LED drivers 204A-204C may, via the communication, agree on a universal intensity level corresponding to the present magnitude of the control signal $V_{CS}$. The LED drivers 204A-204C may then dim their associated LED light sources 202A-202C to the universal intensity level so that consistent light outputs may be produced at the multiple LED light sources despite the variations in the magnitudes of the control signal at each of the LED drivers. The LED drivers 204A-204C may be configured to perform one or more of the foregoing operations in a special mode (e.g., during commissioning, at start-up, and/or when initiated by a user). The LED drivers 204A-204C may be configured to perform one or more of the foregoing operations constantly (e.g., during normal operation of the electrical load without entering a special mode).

For example, when the magnitude of the control signal $V_{CS}$ received by one of the LED drivers 204A-204C is equal to (or less than) the stored low-end magnitude $V_{LE}$, the LED driver may be configured to transmit an indication signal (e.g., a simple signal) to indicate that the LED driver is at the low-end intensity $L_{LE}$. For example, the LED drivers 204A-204C may transmit the indication signal by transmitting a wireless signal, e.g., a radio-frequency (RF) signal, and/or generating a high-frequency signal and/or a pulse on the control wiring 210. The LED drivers 204A-204C that receive the indication signal may store the present magnitude of the control signal $V_{CS}$ as the low-end magnitude $V_{LE}$ in the dimming curve and rescale the dimming curve between the stored high-end magnitude $V_{HE}$ and the updated low-end magnitude $V_{LE}$. The LED driver 204A-204C may also be configured to adjust the high-end voltage $V_{HE}$ in a similar manner. In addition, the LED drivers 204A-204C may be configured to synchronize multiple points between the low-end magnitude $V_{LE}$ and the high-end magnitude $V_{HE}$. When one of the LED drivers 204A-204C is generating a high-frequency signal and/or a pulse on the control wiring 210 to transmit the indication signal, the LED drivers may be configured to controlling the respective LED light sources 202A-202C in response to the control signal $V_{CS}$.

In addition, the LED drivers 204A-204C may each be configured to update the stored low-end magnitude $V_{LE}$ and/or the stored high-end magnitude $V_{HE}$ as described above with reference to the LED driver 104 of FIG. 1 (e.g., without communicating with each other). For example, each of the LED drivers 204A-204C may be configured to measure the magnitude of the control signal $V_{CS}$ and update the stored low-end magnitude $V_{LE}$ and/or the stored high-end magnitude $V_{HE}$ if the measured magnitude is outside of the range of the stored low-end magnitude $V_{LE}$ and the stored high-end magnitude $V_{HE}$.

Figure 3:
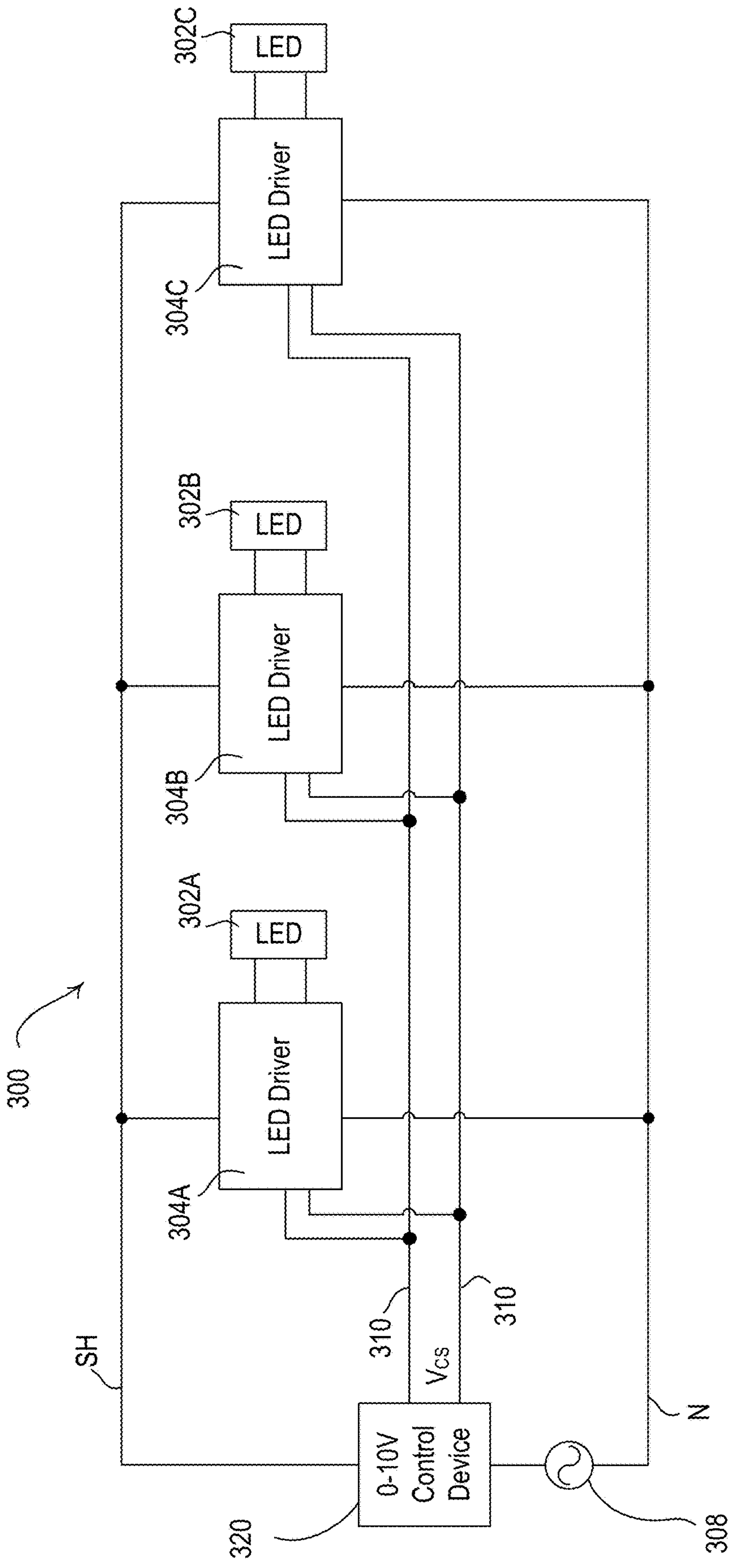
FIG. 3 shows another example load control system comprising multiple LED drivers controlled by a remote control device.

FIG. 3 shows another example load control system 300 comprising multiple LED light sources 302A-302C with respective LED drivers 304A-304C controlled by a remote control device (e.g., a 0-10V control device 320). The 0-10V control device 306 may be connected to an AC power source 308 (e.g., to a hot side of the AC power source), and may generate a switched hot output SH for controlling the power delivered to the LED drivers 304A-304C. The 0-10V control device 320 may be configured to additionally produce an analog control signal (e.g., a 0-10V control signal $V_{CS}$) via control wiring 310 (e.g., in response to receiving a user input such as a dimming command). Each of the LED drivers 304A-304C may be adapted to receive a line voltage between the switched hot side SH of the 0-10V control device and a neutral side N of the AC power source 308. Each LED driver 304A-304C may be adapted to receive the 0-10V control signal $V_{CS}$ via the control wiring 310.

Since the LED light sources 302A-302C may be installed at different locations, and/or be connected to the 0-10V control device 320 through wirings of different characteristics (e.g., the lengths of the wirings may be different, the electromagnetic properties of the wirings may be different, etc.), the control signal $V_{CS}$ generated by the 0-10V control device 320 may exhibit different degrees of degradation as received by the respective LED drivers 304A-304C. For example, the 0-10V control device 320 may transmit a control signal $V_{CS}$ with a preconfigured low-end magnitude $V_{LE}$ (e.g., 1 volt) in response to a user input to set all of the LED light sources to a low-end intensity $L_{LE}$ (e.g., approximately 1%). Because of the varying characteristics (e.g., different resistance) of the wiring between the 0-10V control device 320 and the LED drivers 304A-304C, and/or other electromagnetics conditions, the first LED driver 304A may sense the magnitude of the control signal $V_{CS}$ at 1.2V while the second LED driver 304B may sense the magnitude of the control signal at 1.1V. If both of the LED drivers are configured to react to the control signal $V_{CS}$ in accordance with a preconfigured dimming curve and are not configured to accommodate the variations in the magnitudes of the control signal $V_{CS}$ as received by the two LED driver 304A, 304B, the light output of the two LED light sources 302A, 302B may be dimmed to different intensity levels, even though the user's intention was to set both light sources to the same intensity level (e.g., the low-end intensity $L_{LE}$).

The 0-10V control device 320 may communicate with the LED drivers 304A-304C to cause the LED drivers to adjust their preconfigured intensity levels (e.g., the LED drivers may rescale respective dimming curves), and control their associated LED light sources accordingly (e.g., based on the rescaled dimming curves). The 0-10V control device 320 may be configured to initiate a calibration procedure to synchronize the dimming curves of the LED drivers 304A-304C to ensure that each of the LED light sources 202A-202C is controlled to the same intensity in response to the control signal $V_{CS}$ generated by the 0-10V control device 320. For example, the 0-10V control device 320 may step through a plurality of magnitudes of the control signal $V_{CS}$ between the low-end magnitude $V_{LE}$ and the high-end magnitude $V_{HE}$ and the LED drivers 304A-304C may measure and store the magnitude of the control signal $V_{CS}$ at the respective LED driver for each of the steps. The LED drivers 304A-304C may generate a dimming curve from the stored magnitudes of the control signal $V_{CS}$ for using during normal operation. The LED drivers 304A-304C may then control their associated LED light sources according to the dimming curve determined from the stored magnitudes of the control signal $V_{CS}$.

In addition, the LED drivers 304A-304C may each be configured to communicate with each other in order to synchronize their dimming curves as described above with reference to the LED drivers 204A-204C of FIG. 2. Further, the LED drivers 304A-304C may each be configured to update the stored low-end magnitude $V_{LE}$ and/or the stored high-end magnitude $V_{HE}$ by measuring the magnitude of the control signal $V_{CS}$ and updating the stored low-end magnitude $V_{LE}$ and/or the stored high-end magnitude $V_{HE}$ if the measured magnitude is outside of the range of the stored low-end magnitude $V_{LE}$ and the stored high-end magnitude $V_{HE}$ as described above with reference to the LED driver 104 of FIG. 1.

Although the LED drivers are described herein as being capable of communicating with each other directly, it will be appreciated that the LED drivers may also be capable of communicating with each other via an intermediate device. For example, the LED drivers may communicate wirelessly (e.g., via RF signals) with a system controller or a smart personal device (e.g., a smartphone), which may then relay the communication message(s) to other LED drivers.

Figure 4:
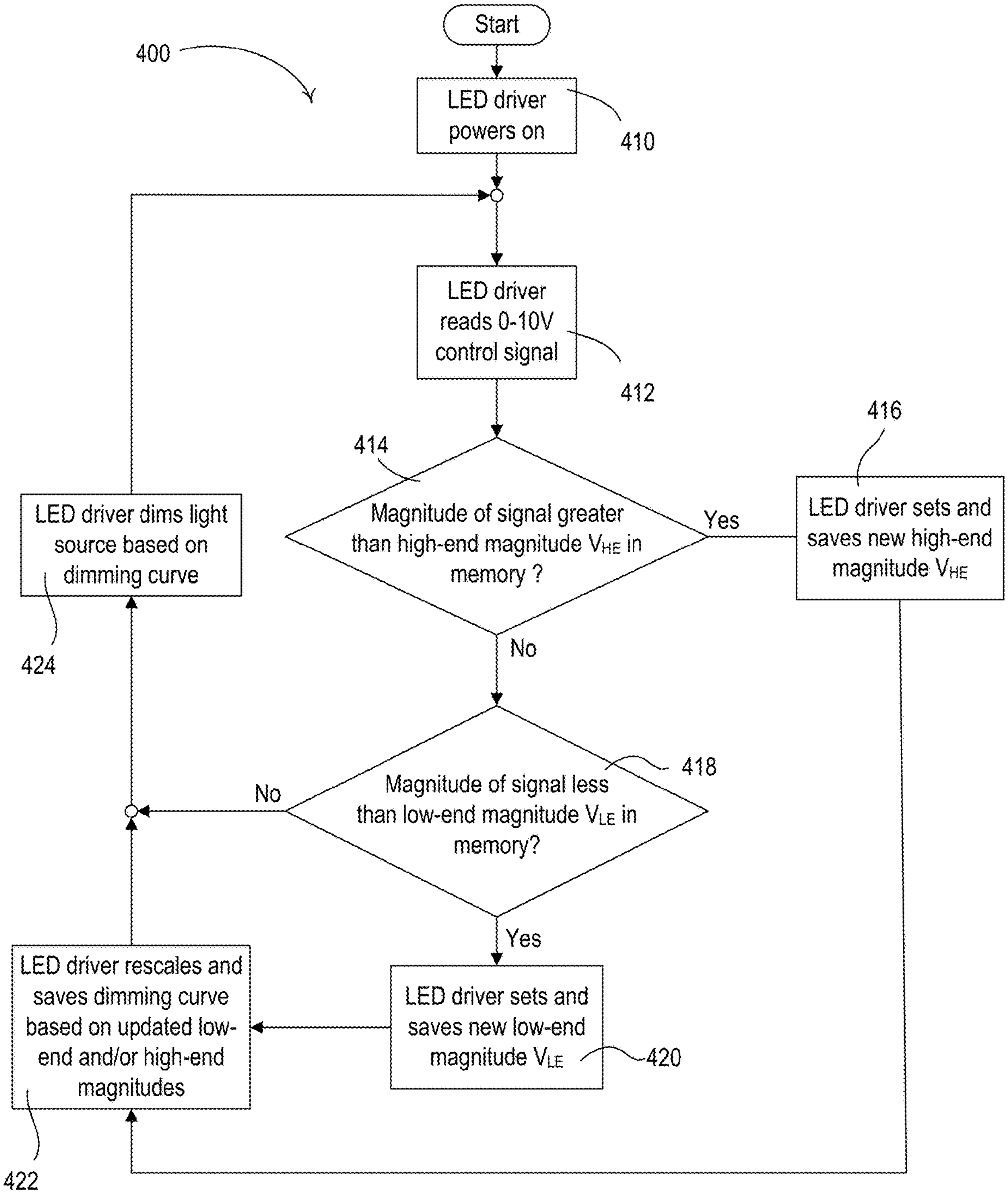
FIG. 4 illustrates an example technique for adjusting the dimming curve of an LED driver in response to a 0-10V control signal during normal operation of the LED driver.

FIG. 4 illustrates an example technique 400 for adjusting a target intensity of a load regulation device (e.g., an LED driver) in response to an analog control signal (e.g., a 0-10V control signal) during normal operation of the LED driver (e.g., the LED drivers 104, the LED drivers 204A-204C, and/or the LED drivers 304A-304C). The LED driver may be preconfigured with a dimming curve that defines a relationship between the target intensity and the magnitude of the 0-10V control signal. According to the preconfigured dimming curve, the magnitude of the 0-10V control signal may range from a low-end magnitude $V_{LE}$ to a high-end magnitude $V_{HE}$. Each of the low-end magnitude $V_{LE}$, the high-end magnitude $V_{HE}$, and a plurality of intermediate magnitudes may correspond to target intensities of the LED driver. The magnitudes of the 0-10V control signal (e.g., the control input voltages) and/or their associated target intensities may be stored in a memory of the LED driver.

The LED driver may power on at 410, and read (e.g., measure) a 0-10V control signal at 412. At 414, the LED driver may compare the 0-10V control signal to the preconfigured high-end magnitude $V_{HE}$ stored in memory. If the LED driver determines that the 0-10V control signal is greater than the preconfigured high-end magnitude $V_{HE}$, the LED driver may replace the preconfigured high-end magnitude $V_{HE}$ with the sensed 0-10V control signal, at 416. If the 0-10V control signal is not greater than the preconfigured high-end magnitude $V_{HE}$, the LED driver may compare the 0-10V control signal with the preconfigured low-end magnitude $V_{LE}$, at 418. If the LED driver determines that the 0-10V control signal is less than the preconfigured low-end magnitude $V_{LE}$, the LED driver may replace the preconfigured low-end magnitude $V_{LE}$ with the sensed 0-10V control signal, at 420. If the LED driver determines, after conducting the comparison at 414 and 418, that the 0-10V control signal falls within the preconfigured low-end magnitude $V_{LE}$ and the preconfigured high-end magnitude $V_{HE}$, the LED driver may keep the preconfigured low-end and high-end control input voltages unchanged.

Upon determining that the low-end magnitude $V_{LE}$ and/or the high-end magnitude $V_{HE}$ has changed, the LED driver may, at 422, rescale the preconfigured dimming curve based on the new low-end magnitude $V_{LE}$ and/or the high-end magnitude $V_{HE}$. The LED driver may perform the rescaling in various ways. The LED driver may be configured to rescale light intensity levels to control input voltages actually received by the LED driver. For example, if the LED driver receives a low-end magnitude at 0.8V instead of a preconfigured magnitude of 1V, the LED driver may remap the preconfigured low-end intensity level $L_{LE}$ (e.g., an intensity level of 1%) to 0.8V (e.g., 0.8V may become the new low-end magnitude). The LED driver may be configured to rescale the magnitude of the control signal actually measured by the LED driver to a voltage on the preconfigured dimming curve (e.g., such that preconfigured mappings between light intensity levels and control input voltages may not have to be changed). For example, if the LED driver receives a low-end magnitude at 0.8V instead of a preconfigured magnitude of 1V, the LED driver may rescale 0.8V to 1V so that the preconfigured low-end intensity level $L_{LE}$ (e.g., 1%) may be set as the target intensity level of the light source in response to the LED driver sensing the 0.8V control input. The LED driver may save the rescaled dimming curve (e.g., update the mappings between light intensity levels and control input voltages in memory). Alternatively, the LED drivers may determine the rescaled light intensity levels without saving them in memory.

At 424, the LED driver may dim the LED light source (e.g., whether or not the dimming curve has been rescaled). If the magnitudes of the low-end and high-end magnitudes are unchanged from their preconfigured values, the LED driver may dim the LED light source based on the preconfigured dimming curve. If either or both of the low-end and high-end magnitudes have been changed from their preconfigured values, the LED driver may set the intensity of the LED light source based on a rescaled version of the preconfigured dimming curve.

Figure 5:
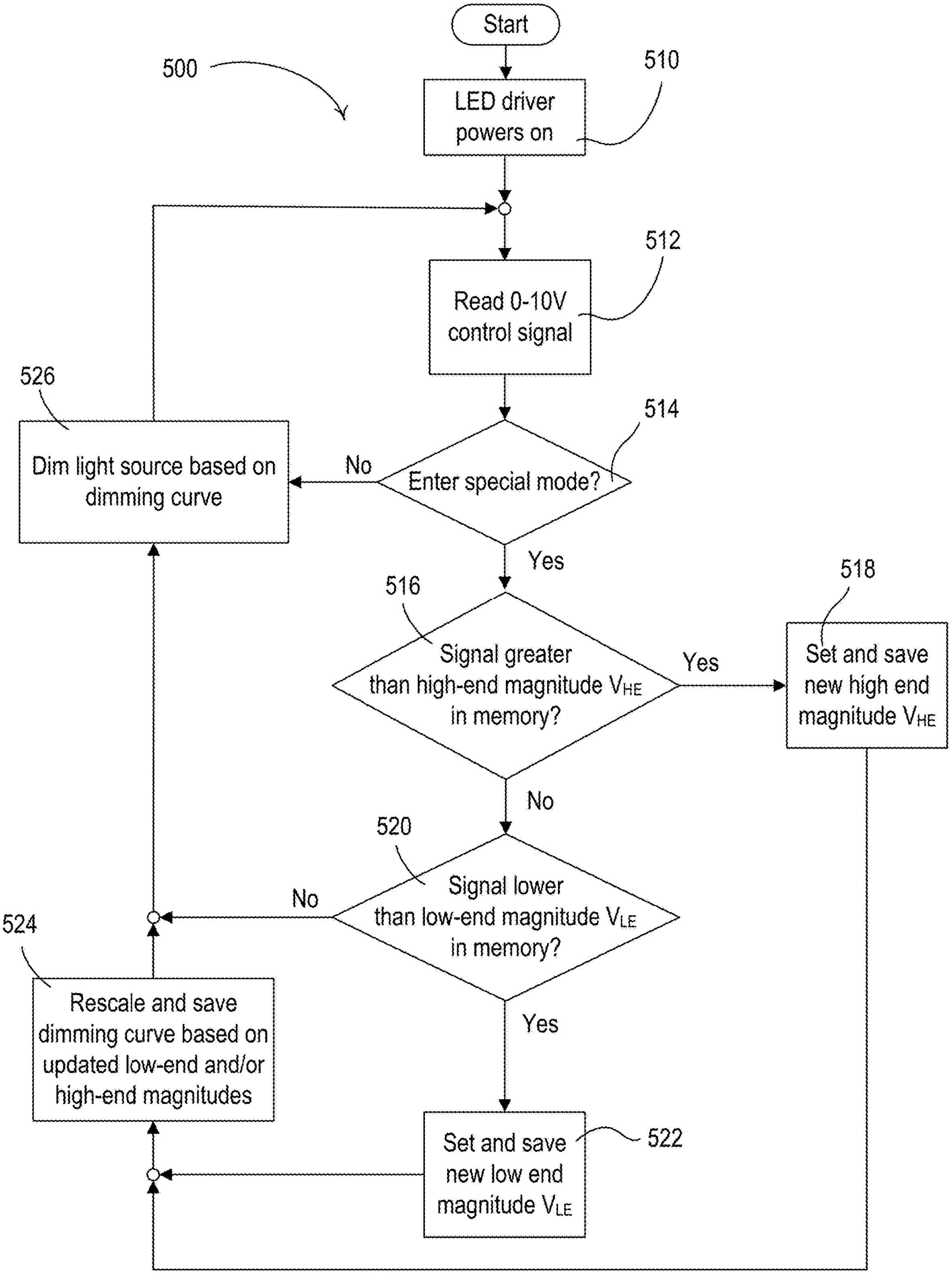
FIG. 5 illustrates an example technique for adjusting the dimming curve of an LED driver in response to a 0-10V control signal during a special mode.

FIG. 5 illustrates an example technique 500 for adjusting the dimming curve of an LED driver (e.g., the LED drivers 104, the LED drivers 204A-204C, and/or the LED drivers 304A-304C) in response to a 0-10V control signal using a special mode. The LED driver may be preconfigured with a dimming curve in relation to the 0-10V control signal. The preconfigured range of the control signal may be between a low-end magnitude $V_{LE}$ and a high-end magnitude $V_{HE}$. Each of the low-end magnitude $V_{LE}$, the high-end magnitude $V_{HE}$, and a plurality of intermediate magnitudes may correspond to a target intensity level of the LED light source. The magnitudes and/or their associated target intensity levels may be stored in a memory of the LED driver.

The LED driver may power on at 510. Upon powering on, the LED driver may receive (e.g., measure) a 0-10V control signal at 512. At 514, the LED driver may determine whether it should enter a special mode in which the LED driver may adjust its preconfigured dimming curve in relation to the 0-10V control signal received by the LED driver. The LED driver may be configured to automatically enter the special mode or wait for a user command to enter the special mode. The LED driver may decide not to enter the special mode, in which case the LED driver may maintain the preconfigured dimming curve and continue with normal operation. During normal operation, the LED driver may, for example, enter the special mode in response to a user command.

If the LED driver decides at 514 to enter the special mode, the LED driver may, at 516, compare the 0-10V control signal to the preconfigured high-end control input voltage $V_{HE}$. If the LED driver determines that the 0-10V control signal is greater than the preconfigured high-end magnitude $V_{HE}$, the LED driver may replace the preconfigured high-end magnitude $V_{HE}$ with the sensed 0-10V control signal, at 518. If the 0-10V control signal is not greater than the preconfigured high-end control input voltage $V_{HE}$, the LED driver may further compare the 0-10V control signal with the preconfigured low-end magnitude $V_{LE}$, at 520. If the LED driver determines that the received 0-10V control signal is less than the preconfigured low-end magnitude $V_{LE}$, the LED driver may replace the preconfigured low-end control input voltage $V_{LE}$ with the 0-10V control signal, at 522.

If either or both of the preconfigured low-end magnitude $V_{LE}$ and high-end magnitude $V_{HE}$ are updated, the LED driver may use the new values to adjust the preconfigured dimming curve, at 524 (e.g., using the rescaling techniques described herein). The LED driver may then select a target intensity for the LED light source based on the received 0-10V control signal and the rescaled dimming curve, at 526, before exiting the special mode. If the LED driver determines, after conducting the comparison at 516 and 520, that the received 0-10V control signal falls within the preconfigured low-end magnitude $V_{LE}$ and the preconfigured high-end magnitude $V_{HE}$, the LED driver may keep the low-end and high-end magnitudes $V_{LE}$, $V_{HE}$ and the preconfigured dimming curve unchanged. The LED driver may then dim the LED light source in accordance with the preconfigured dimming curve, at 526.

Multiple LED drivers controlled by a remote control device (e.g., a 0-10V control device) may be configured to communicate with each other (e.g., via wired or wireless communication schemes, as described herein). The information communicated may include a status of the LED driver (e.g., reporting of an operational failure), the output current/power of the LED driver, the intensity of the LED light source, the color temperature of the LED light source, the color of the LED light source, an outage condition occurred at the LED light source, and/or the like. The communication may be received by other LED drivers, which may adjust their own operation based on information included in the communication (e.g., such that the multiple LED drivers may have a matched target intensity level in response to a control signal transmitted by the remote control device despite differences in the magnitudes as received by the LED drivers).

Figure 6:
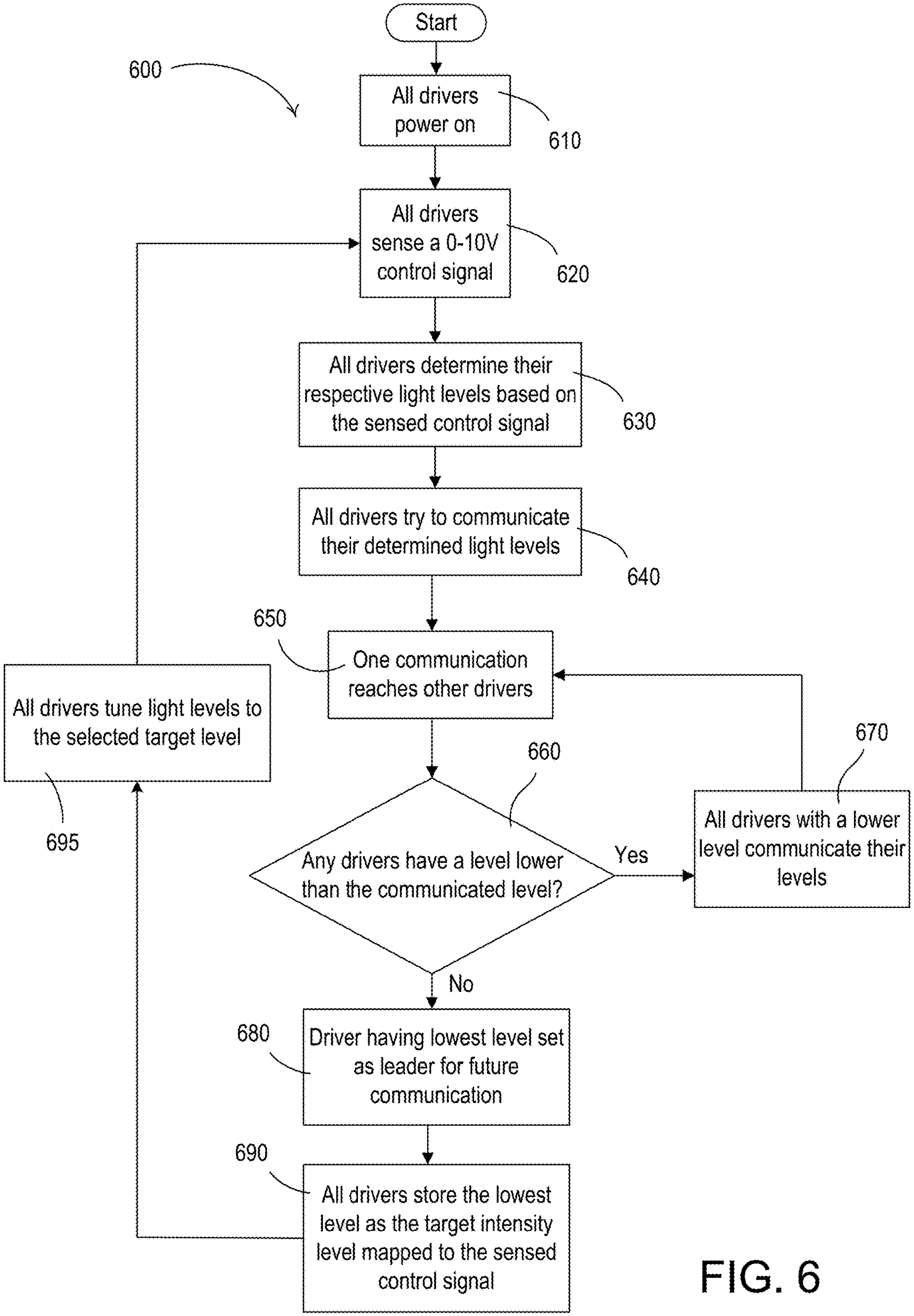
FIG. 6 illustrates an example technique for achieving consistent dimming performances among multiple LED drivers controlled by a remote control device.

FIG. 6 illustrates an example technique 600 for achieving consistent dimming performances among multiple LED drivers (e.g., the LED drivers 204A-204C and/or the LED drivers 304A-304C) controlled by a remote control device (e.g., a 0-10V control device). The LED drivers may each be preconfigured with a dimming curve in relation to a control signal generated by the 0-10V control device. The preconfigured range of the control signal may be between a low-end magnitude $V_{LE}$ and a high-end magnitude $V_{HE}$. Each of the low-end magnitude $V_{LE}$, the high-end magnitude $V_{HE}$, and a plurality of intermediate magnitudes may correspond to a target intensity level of the LED light source. The magnitudes and/or their associated target intensity levels may be stored in a memory of the LED driver.

The multiple LED drivers may power on at 610, and measure a 0-10V control signal transmitted by the 0-10V control device at 620. At 630, each LED driver may determine a target intensity level for its associated LED light source based on the measured 0-10V control signal. At 640, one or more of the LED drivers (e.g., all of the LED drivers) may attempt to communicate to the other LED drivers about the measured magnitudes of the control signal and/or preconfigured intensity levels of the LED drivers that correspond to the measured magnitudes. The communication may indicate the actual preconfigured intensity levels (e.g., 1%, 5%, 50%, etc.) of the LED drivers that correspond to the measured magnitudes of the 0-10V control signal (e.g., based on the preconfigured dimming curves of the LED drivers). Alternatively or additionally, the communication may indicate where the corresponding intensity levels are along the transmitting LED drivers' dimming curves. For example, a LED driver may indicate that its intensity level corresponding to the measured magnitude of the control signal is at a low end of the dimming range without specifying the actual value of the target intensity level.

The communication may be conducted via wired (e.g., via DALI, EcoSystem links, power-line communication (PLC) techniques, etc.) or wireless (e.g., via RF signals) communication schemes, for example, as described herein. The communication may be conducted on the 0-10V control line in selected time periods during which the LED drivers involved in the communication may temporarily cease measuring the 0-10V control signal on the control line (e.g., a receiving LED driver may avoid measuring the magnitude of the 0-10V control signal while a sending LED driver is transmitting a communication signal using the control line). For example, the LED drivers may be configured to short the 0-10V control line to communicate a "0" or a "1," the LED drivers may be configured to perform another sort of PLC over the control line, and/or the LED drivers may be configured to communicate wirelessly with one another.

At 650, one of the communications may be received by other LED drivers in the system. At 660, the recipients of the communication may check whether their own target intensity levels in response to measuring the 0-10V control signal are lower than the level indicated in the communication. At 670, the LED drivers with lower target intensity levels may communicate their respective levels, and the operations described in association with 650-670 may be repeated until the lowest target intensity level is identified. At 680, the LED driver reporting the lowest target intensity level may be designated as the leader of future communications (e.g., all other LED drivers may subsequently listen to communications from the leader, and adapt their respective dimming operations in accordance with the actions taken by the leader). In an alternative implementation, one of the LED drivers may be preconfigured (e.g., pre-programmed) as the leader of the LED drivers and may dictate a common intensity level for all the LED drivers in response to a measured control signal. In yet another alternative implementation, the actions taken at 680 may be omitted and no leader will be designated (e.g., the LED drivers may adapt their respective dimming operations based on the lowest intensity level communicated among the drivers, without designating a leader for future operations).

At 690, the LED drivers may store the lowest target intensity level identified through the foregoing process as the common intensity level corresponding to the respective magnitudes of the control signal measured by the LED drivers. For example, where the LED drivers are configured to merely indicate whether their light intensities are at the low end as oppose to reporting the actual light intensities, one of LED drivers may report that its target light intensity in response to a measured 0-10V control signal is the low-end intensity $L_{LE}$, while the other LED drivers may report that their target light intensities are above the low-end intensity $L_{LE}$. As such, the LED drivers may determine that the light intensity that maps to their respective measured magnitudes of the 0-10V control signal should be the low-end intensity $L_{LE}$, and the LED drivers may adjust their respective preconfigured dimming curves accordingly (e.g., the adjustment may be made using the rescaling techniques described herein). At 695, the LED drivers may tune the respective intensities of their associated LED light sources based on the adjusted dimming curves.

As another example (e.g., where the LED drivers are configured to report their actual light intensities corresponding to a measured 0-10V control signal), the LED drivers may synchronize their dimming behavior at multiple points along the dimming range. For instance, in response a common 0-10V control signal, a first LED driver may report a 49% target light intensity, a second LED driver may report a 50% target light intensity, and a third LED driver may report a 51% target light intensity. As such, the LED drivers may determine that a common target intensity level corresponding to the 0-10V control signal should be the lowest level (e.g., 49%), and the LED drivers may map that level to their respective measured magnitudes of the 0-10V control signal. Other schemes may also be used to determine the common intensity level. For instance, an average of the reported target intensity levels may be taken as the common intensity level (e.g., if the reported light intensity levels are 49%, 50%, and 51%, the common intensity level may be determined to be 50%). As another example, a leader of the LED drivers (e.g., designated via the techniques described herein) may determine a common intensity level in response to the 0-10V control signal, and instruct the other drivers to adjust their respective target intensities to the common intensity level.

Figure 7:
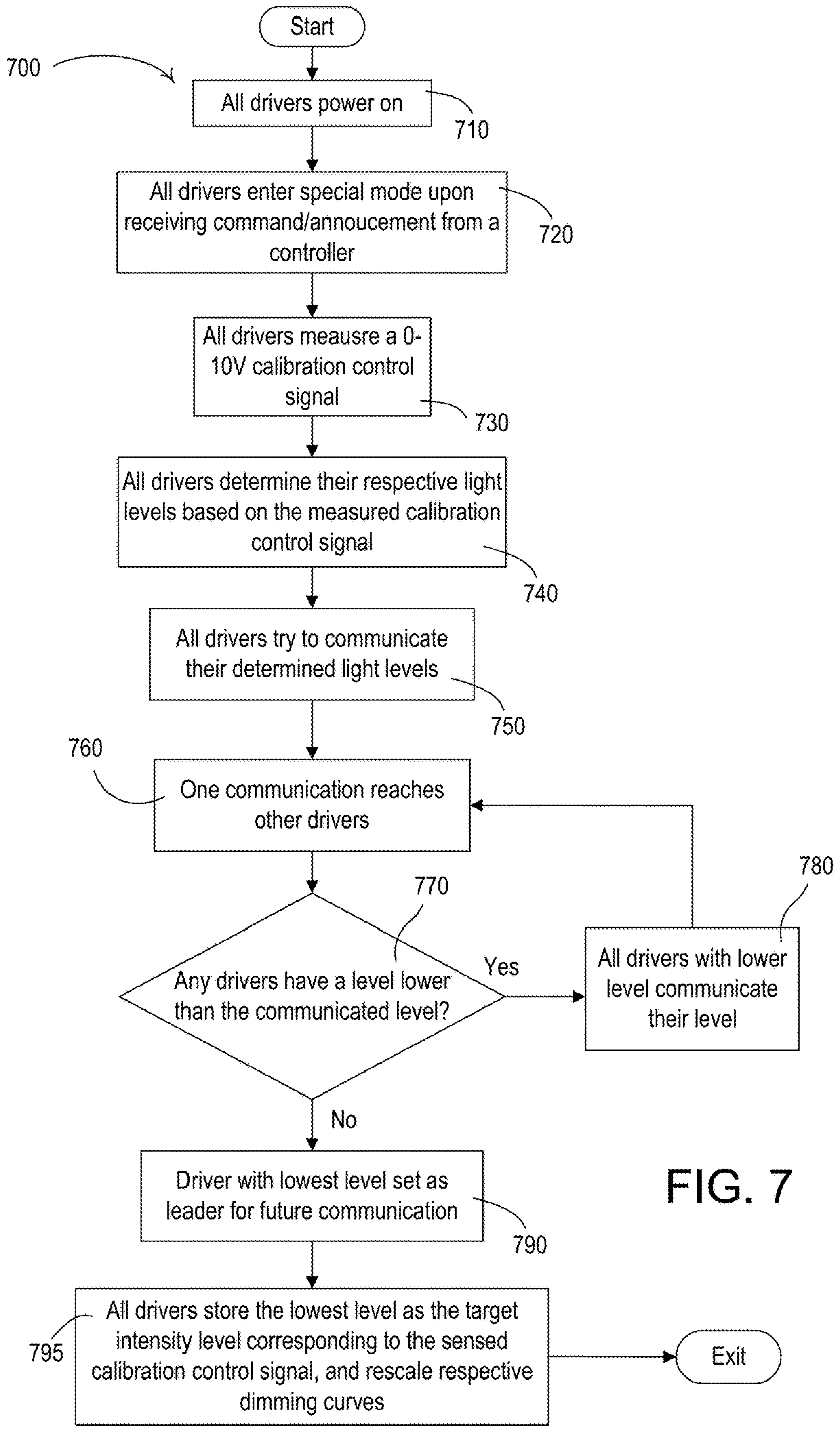
FIG. 7 illustrates an example technique for using a special mode to achieve consistent dimming performances among multiple LED drivers controlled by a remote control device.

The communication and/or coordination described herein may be conducted in a special mode (e.g., a calibration mode). FIG. 7 illustrates an example technique 700 for using such a special mode to achieve consistent dimming performances among multiple LED drivers (e.g., the LED drivers 304A-304C) controlled by a remote control device (e.g., a 0-10V control device 320). The LED drivers may each be preconfigured with a dimming curve in relation to an analog control signal (e.g., the control signal $V_{CS}$) generated by the 0-10V control device. The preconfigured range of the control signal may be between a low-end magnitude $V_{LE}$ (e.g., 1 volt) and a high-end magnitude $V_{HE}$ (e.g., 10 volts). Each of the low-end magnitude $V_{LE}$, the high-end magnitude $V_{HE}$, and a plurality of intermediate control input voltages may correspond to a target intensity level of the LED light source. The magnitudes and/or their associated target intensity levels may be stored in a memory of the LED driver.

The LED drivers may power on at 710, and receive a signal (e.g., the signal may include a command and/or an announcement to enter a special mode such as a calibration mode). The command or announcement may be transmitted to the LED drivers from the remote control device that may be configured to communicate with the LED drivers and initiate the special mode (e.g., to orchestrate the calibration of the multiple LED drivers). The LED drivers receiving the command or announcement may enter the special mode at 720, and may send an acknowledge message to the remote control device. Once in the calibration mode, the LED drivers may receive and measure, at 730, a plurality of magnitudes of the control signal $V_{CS}$ that may include the low-end magnitude $V_{LE}$, the high-end magnitude $V_{HE}$, and/or a magnitude between the low-end and high-end magnitudes $V_{LE}$, $V_{HE}$. For example, the LED drivers may receive and measure multiple magnitudes of the control signal $V_{CS}$ intended to synchronize the dimming operations of the LED drivers at multiple intensity levels (e.g., 10%, 20%, 30%, etc.). The remote control device may be configured to transmit the magnitudes in response to receiving a user input or a command from a central controller. At 740, each LED driver may determine a target intensity level for its associated LED light source in response to the measured magnitude (e.g., based on the predetermined dimming curve of the LED driver).

At 750, one or more of the LED drivers (e.g., all of the LED drivers) may attempt to communicate information about their respective target intensity levels (e.g., in response to receiving and measuring the control signal $V_{CS}$) to other LED drivers. The information may indicate the actual target intensity level of the transmitting LED driver in response to receiving and measuring the control signal $V_{CS}$. Alternatively or additionally, the information may include an indication of where the target intensity level is along the LED driver's dimming range (e.g., the information may indicate whether the target intensity level is at the low-end intensity $L_{LE}$ or the high-end intensity $L_{HE}$ of the dimming range, without specifying the actual value of the target intensity level). The communication may be conducted via wired (e.g., via DALI, EcoSystem links, PLC techniques, etc.) or wireless (e.g., via RF signals) communication schemes, for example, as described herein. The communication may be conducted on the 0-10V control line in selected time periods during which the LED drivers involved in the communication may temporarily cease reading the analog control signal from the control line (e.g., a receiving LED driver may avoid measuring the magnitude of the control signal $V_{CS}$ while the sending LED driver is transmitting a control signal using the control line). For example, the LED drivers may be configured to short the 0-10V control line to communicate a "0" or a "1," the LED drivers may be configured to perform another sort of PLC over the control line, and/or the LED drivers may be configured to communicate wirelessly with one another.

At 760, one of the communications may be received by other LED drivers in the system. At 770, each recipient of the communication may check whether its own target intensity level is lower than the communicated level. At 780, the LED drivers with a lower target intensity level than the communicated level may communicate their respective levels to other drivers, and the operations described in association with 760-780 may be repeated until the lowest target intensity level is identified. For example, one of the LED drivers may report that its target light intensity corresponding to the measured magnitude of the 0-10V control signal is the low-end intensity $L_{LE}$, while the other LED drivers may report target light intensities above the low-end intensity $L_{LE}$. As such, the LED drivers may determine that the intensity level that maps to the measured magnitude of the control signal $V_{CS}$ should be the low-end intensity $L_{LE}$.

At 790, the LED driver having the lowest target intensity level may be designated as the leader of future communications (e.g., all other LED drivers may subsequently listen to communications from the leader, and may adapt their respective dimming operations in accordance with the actions taken by the leader). In an alternative implementation, one of the LED drivers may be pre-configured (e.g., pre-programmed) as the leader of the LED drivers and may dictate a common intensity level for all the LED drivers in response to a measured control signal. In yet another alternative implementation, the actions taken at 790 may be omitted and no leader will be designated (e.g., the LED drivers may adapt their respective dimming operations based on the lowest intensity level communicated among the drivers, without designating a leader for future operations). At 795, the LED drivers may rescale their respective preconfigured dimming curves (e.g., using the rescaling techniques described herein) based on the lowest reported target intensity level among the LED drivers, e.g., so that the dimming behaviors of the LED drivers may be synchronized. Once the synchronization is completed, the drivers may exit the calibration mode.

In the examples described herein, a designated controller (e.g., a control device, such as a 0-10V control device, a system controller, and/or the like) may coordinate the operation of multiple load regulation devices (e.g., LED drivers). Alternatively, one of the multiple load regulation devices may act as the controller. The load regulation devices may be controlled by a common load control device (e.g., a 0-10V control device), and may be capable of communicating with each other (e.g., via a 0-10V control line connecting the LED drivers and the load control device, using a wireless communication scheme, etc.). The controller may communicate with the load regulation devices using one or more of the communication techniques described herein (e.g., via the 0-10V control line), and may transmit control signals/messages (e.g., such as an announcement to enter a calibration mode) to the load regulation devices. In an example implementation of this feature, the controller may announce the start of a special mode for calibration, and each LED driver receiving the announcement may enter the special mode and send an acknowledge message to the controller upon completing the calibration.

A calibration procedure may also be performed with limited or no communication between the remote control device (e.g., the 0-10V control device 320 shown in FIG. 3) and the LED drivers (e.g., the LED drivers 304A-304C). The LED drivers may be configured to enter a special mode (e.g., a calibration mode) in response to a signal received from the remote control device. The remote control device may adjust (e.g., step) the magnitude of the control signal $V_{CS}$ to a plurality of different magnitudes between the high-end magnitude $V_{HE}$ and the low-end magnitude $V_{LE}$, and the LED drivers may measure and store the magnitude of the control signal $V_{CS}$ for each of the steps. The remote control device may first control the magnitude of the control signal $V_{CS}$ to the high-end magnitude $V_{HE}$ (e.g., 10 volts) and then decrease the magnitude of the control signal $V_{CS}$ by a step voltage VSTEP (e.g., 1 volt), until the magnitude of the control signal $V_{CS}$ reaches the low-end magnitude $V_{LE}$ (e.g., 1 volt). The remote control device may maintain the magnitude of the control signal $V_{CS}$ at each of the steps for a step time period $T_{STEP}$ (e.g., 10 seconds) to allow the LED drivers to measure the magnitude of the control signal $V_{CS}$ at each step. The LED drivers may each generate a dimming curve from the stored magnitudes of the control signal $V_{CS}$ at each of the steps for use during normal operation. The LED drivers may then control their associated LED light sources according to the dimming curve determined from the stored magnitudes of the control signal $V_{CS}$.

Figure 8:
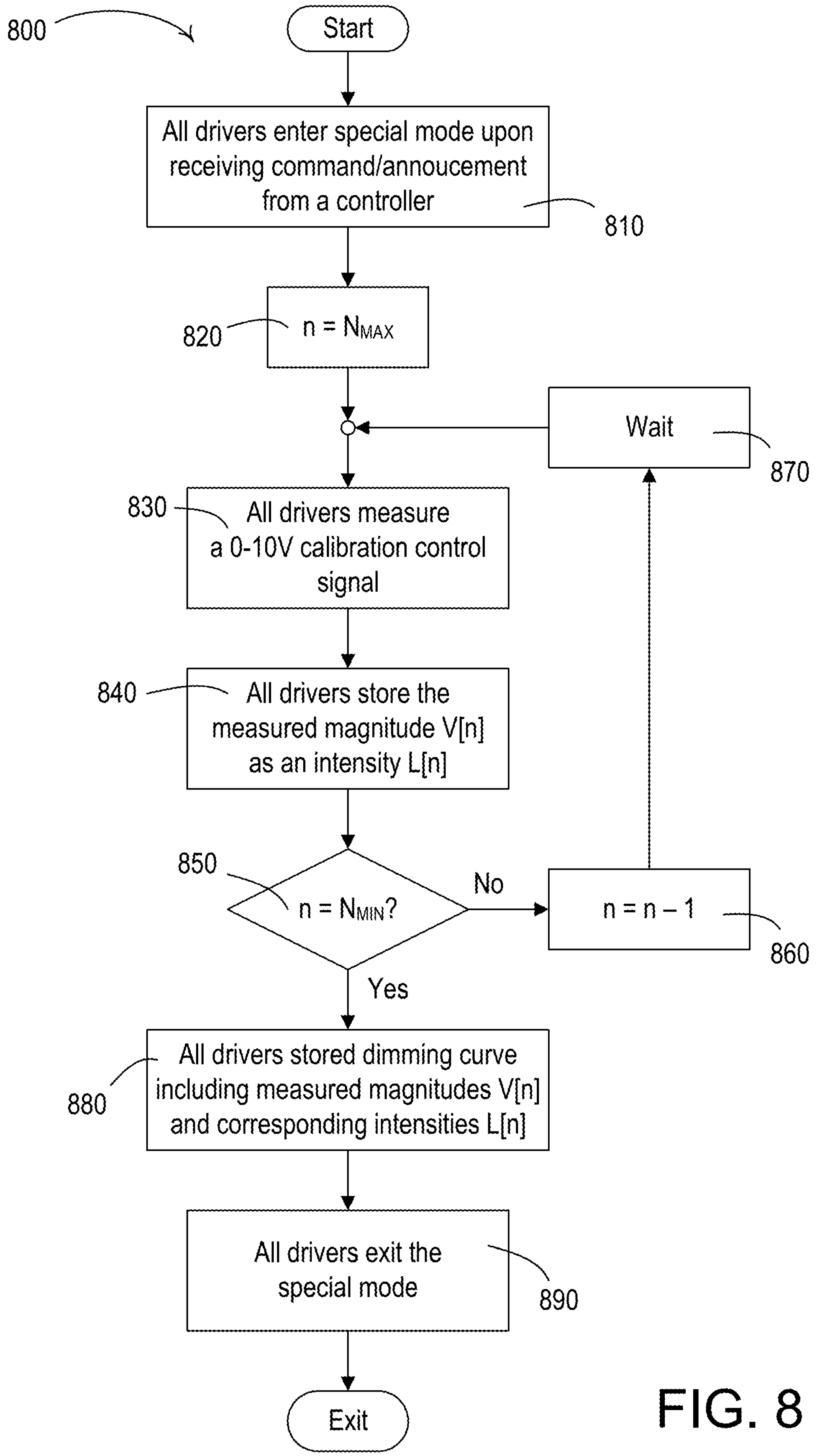
FIG. 8 illustrates another example technique for using a special mode to achieve consistent dimming performances among multiple LED drivers controlled by a remote control device.

FIG. 8 illustrates an example technique 800 for using a special mode to achieve consistent dimming performances among one or more LED drivers (e.g., the LED drivers 304A-304C) controlled by a remote control device (e.g., the 0-10V control device 320). The LED drivers may each be preconfigured with a dimming curve in relation to a control signal generated by the 0-10V control device. The preconfigured range of the control signal may be between a low-end magnitude $V_{LE}$ (e.g., 1 volt) and a high-end magnitude $V_{HE}$ (e.g., 10 volts). Each of the low-end magnitude $V_{LE}$, the high-end magnitude $V_{HE}$, and a plurality of intermediate magnitudes may correspond to a target intensity level of the LED light source. The magnitudes and/or their associated target intensity levels may be stored in a memory of each LED driver.

The LED drivers may receive a signal (e.g., the signal may include a command and/or an announcement to enter a special mode such as a calibration mode) and enter the special mode at 810. The command or announcement may be transmitted to the LED drivers from the remote control device (e.g., the 0-10V control device 320) that may be configured to communicate with the LED drivers and initiate the special mode (e.g., to orchestrate the calibration of the multiple LED drivers). For example, the remote control device may transmit a digital message including a command to enter the special mode to the LED drivers via one or more wireless signals (e.g., RF signals) and/or via one or more signals conducted on the 0-10V control line. In addition, the remote control device may be configured to cause the LED drivers to enter the special mode by cycling power to the LED drivers (e.g., turning the LED drivers off and on) a predetermined number of times within a period of time (e.g., three times within ten seconds).

The LED drivers may use a variable n to store the measured magnitudes of the control signal $V_{CS}$ while the remote control device steps through the plurality of magnitudes of the control signal $V_{CS}$ during the special mode. The variable n may range between a minimum number $N_{MIN}$ and a maximum number $N_{MAX}$, which may be equal to 1 and 10, respectively, since the low-end and high-end magnitudes $V_{LE}$, $V_{HE}$ of the control signal $V_{CS}$ may be 1 volts and 10 volts. After entering the special mode at 810, the LED drivers may, at 820, initialize the variable n to the maximum number $N_{MAX}$ (e.g., 10) at 820.

At 830, the LED drivers may measure the magnitude of the control signal $V_{CS}$ to generate a measured magnitude sample V[n]. At 840, the LED drivers may store in memory the measured magnitude sample V[n] in correspondence with an intensity L[n]. The intensity L[n] may be derived using the example equation shown below, for example when n ranges between 1 and 10 and the respective intensity ranges of the LED drivers are between 10% and 100%:

$$L[n]=n\cdot 10\%.$$

For example, for an LED driver that has a low-end intensity $L_{MIN}$ of 10% and a high-end intensity $L_{MAX}$ of 100%, the intensity L[n] may be 100% when the variable n equals 10, 90% when the variable n equals 9, 80% when the variable n equals 8, and so on. If the variable n does not equal the minimum number $N_{MIN}$ at 850, the LED drivers may decrement the variable n by one at 860 and wait at 870, before once again measuring the magnitude of the control signal $V_{CS}$ at 830. The LED drivers may wait for the length of the step time period $T_{STEP}$ (e.g., 10 seconds) at 870 before measuring the magnitude of the control signal $V_{CS}$ at 830. In addition, the LED drivers may wait at 870 until the remote control device steps the magnitude of the control signal $V_{CS}$ down to the next level before measuring the magnitude of the control signal $V_{CS}$ at 830. Accordingly, the LED drivers may measure multiple magnitudes of the control signal $V_{CS}$ so as to synchronize the dimming operations of the LED drivers at multiple intensity levels (e.g., 100%, 90%, 80%, etc.).

When the variable n is equal to the minimum number $N_{MIN}$ at 850, the LED drivers may each generate a relationship (e.g., a dimming curve) defined by the measured magnitude samples V[n] at each of the intensities L[n] for the variable n ranging from the minimum number $N_{MIN}$ to the maximum number $N_{MAX}$ at 880. At 890, all of the LED drivers may exit the special mode, and the technique 800 may exit.

In addition to using the calibration and/or communication techniques described herein, a 0-10V control device may also be configured to adjust its control signal using closed loop control. For example, the 0-10V control device may be configured to increase or decrease the magnitude of a 0-10V control signal based on feedback from one or more load regulation devices (e.g., LED drivers). The feedback may be indicative of, for example, the magnitude of an output voltage applied across a light source or the magnitude of a load current conducted through the light source. Using such feedback, the 0-10V control device may automatically account for signal degradation over long wiring to ensure that uniform and consistent light output may be produced at multiple light sources.

Figure 9:
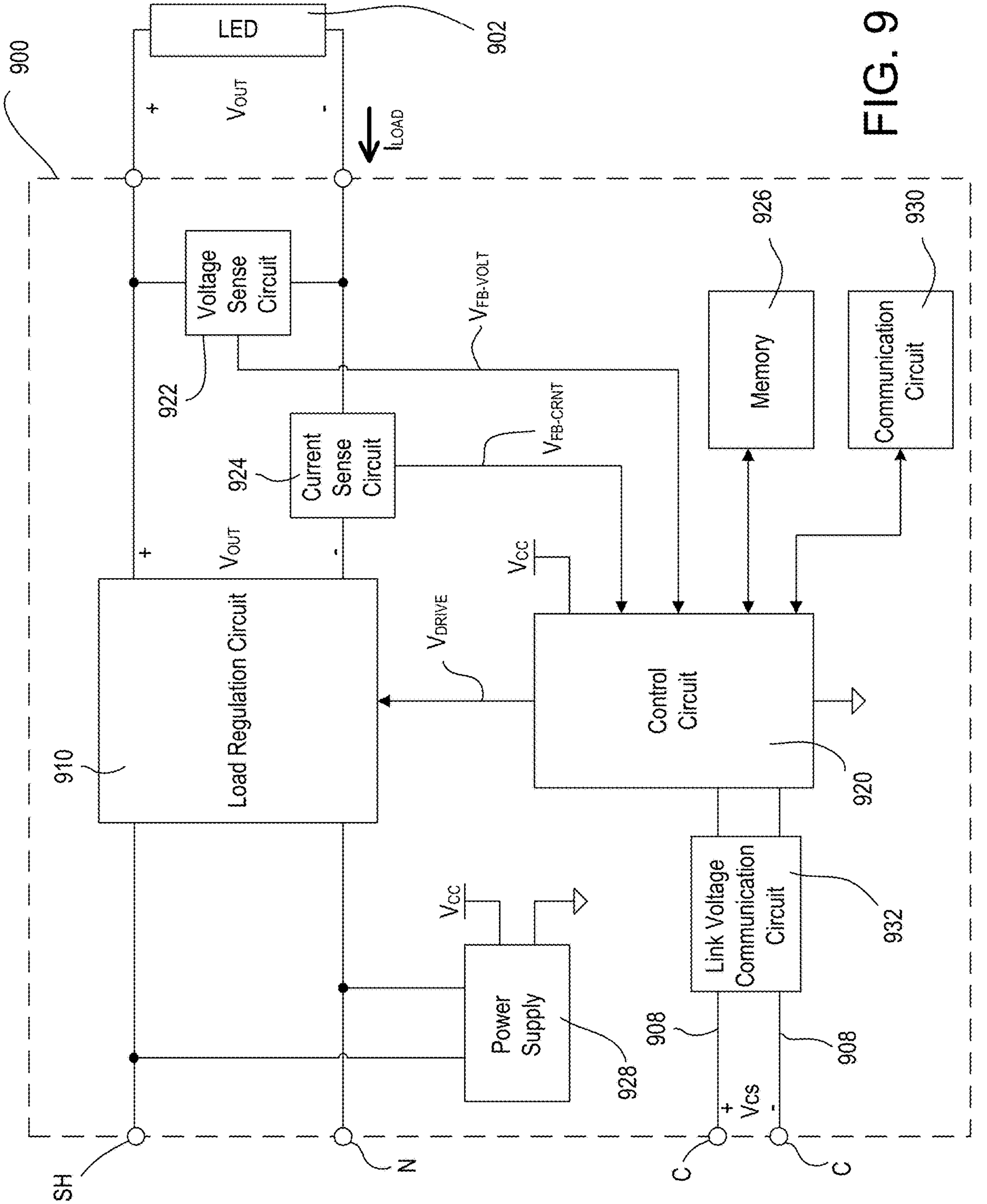
FIG. 9 is a simplified equivalent schematic diagram of an example LED driver depicted in FIG. 1.

FIG. 9 is a simplified block diagram of a load regulation device (e.g., an LED driver 900) that may be deployed as the load regulation device (e.g., the LED driver 104) in the load control system 100 shown in FIG. 1, one or more of the LED drivers 204A-204C in the load control system 200, one or more of the LED drivers 304A-304C in the load control system 300, and/or the like. The LED driver 900 may be configured to implement one or more of the techniques described herein. For example, the LED driver 900 may be configured to control the amount of power delivered to an LED light source 902, and to thus control certain functional aspects of the LED light source, such as the intensity of the LED light source. The LED driver 900 may be powered by an AC or DC power source. When configured to use AC power, the LED driver 900 may comprise a switched hot terminal SH and a neutral terminal N that are adapted to be coupled to a load control device (e.g., the load control device 120) and an alternating-current (AC) power source (e.g., the AC power source 108), respectively. The LED driver 900 may comprise control terminals C configured to receive an analog control signal $V_{CS}$ (e.g., a 0-10V signal).

The LED driver 900 may comprise a load regulation circuit 910, which may control the amount of power delivered to the LED light source 902. For example, the load regulation circuit 910 may control the intensity of the LED light source 902 between a low-end (i.e., minimum) intensity $L_{LE}$ (e.g., approximately 1-5%) and a high-end (e.g., maximum) intensity $L_{HE}$ (e.g., approximately 100%) by pulse-width modulating and/or pulse-frequency modulating the output voltage $V_{OUT}$. The load regulation circuit 910 may comprise, for example, a forward converter, a boost converter, a buck converter, a flyback converter, a linear regulator, or any suitable LED drive circuit for adjusting the intensity of the LED light source. Examples of load regulation circuits for LED drivers are described in greater detail in commonly-assigned U.S. Pat. No. 8,492,987, issued Jul. 23, 2010, and U.S. Patent Application Publication No. 2014/0009085, filed Jan. 9, 2014, both entitled LOAD CONTROL DEVICE FOR A LIGHT-EMITTING DIODE LIGHT SOURCE, the entire disclosures of which are hereby incorporated by reference.

The LED driver 900 may comprise a control circuit 920, e.g., a controller, for controlling the operation of the load regulation circuit 910. The control circuit 920 may comprise, for example, a digital controller or any other suitable processing device, such as, for example, a microcontroller, a programmable logic device (PLD), a microprocessor, an application specific integrated circuit (ASIC), or a field-programmable gate array (FPGA). The control circuit 920 may generate a drive control signal $V_{DRIVE}$ that is provided to the load regulation circuit 910 for adjusting the magnitude of an output voltage $V_{OUT}$ (e.g., to thus adjust the magnitude of a load voltage VLOAD generated across the LED light source 902) and/or the magnitude of a load current $I_{LOAD}$ conducted through the LED light source 902 (e.g., to thus control the intensity of an LED light source).

The LED driver 900 may further comprise a voltage sense circuit 922 (which may be configured to generate an output voltage feedback signal $V_{FB-VOLT}$ that may indicate the magnitude of the output voltage $V_{OUT}$) and a current sense circuit 924 (which may be configured to generate a load current feedback signal $V_{FB-CRNT}$ that may indicate the magnitude of the load current $I_{LOAD}$). The control circuit 920 may receive the voltage feedback signal $V_{FB-VOLT}$ and the load current feedback signal $V_{FB-CRNT}$, and control the drive control signal $V_{DRIVE}$ to adjust the magnitude of the output voltage $V_{OUT}$ and/or the magnitude of the load current $I_{LOAD}$ (e.g., to thus control the intensity of the LED light source to the target intensity $L_{TRGT}$) using a control loop.

The control circuit 920 may be coupled to a storage device (e.g., a memory 926) configured to save the operation parameters of the LED driver 900 (e.g., the target intensity $L_{TRGT}$, the low-end intensity $L_{LE}$, the high-end intensity $L_{HE}$, etc., of the LED light source). The LED driver 900 may further comprise a power supply 928, which may generate a direct-current (DC) supply voltage $V_{CC}$ for powering the circuitry of the LED driver 900.

The LED driver 900 may comprise a communication circuit 930, which may be coupled to, for example, a wired communication link or a wireless communication link, such as a radio-frequency (RF) communication link or an infrared (IR) communication link. The LED driver 900 may be configured to receive digital messages via the communication circuit 930 and update the data stored in the memory 926 in response to receiving the digital messages. The LED driver 900 may be configured to communicate with other devices (e.g., other LED drivers) using the communication circuit 930 (e.g., using a wired or wireless communication scheme). Alternatively or additionally, the LED driver 900 may not include the communication circuit 230, and may communicate with other devices (e.g., other LED drivers) over the 0-10V control line (e.g., via a digital addressable lighting interface (DALI) or using power line communication (PLC) techniques). Techniques for providing communication via existing power wiring are described in greater detail in commonly-assigned U.S. Pat. No. 9,392,675, issued Jul. 12, 2016, entitled DIGITAL LOAD CONTROL SYSTEM PROVIDING POWER AND COMMUNICATION VIA EXISTING POWER WIRING, and U.S. Pat. No. 8,068,814, issued Nov. 29, 2011, entitled SYSTEM FOR CONTROL OF LIGHTS AND MOTORS, the entire disclosures of which are hereby incorporated by reference.

The LED driver 900 may further comprise a load controller (e.g., a PowPak® load control device) that allows for integration of the LED driver 900 with wireless control devices, such as, wireless occupancy sensors, wireless daylight sensors, and/or other wireless controls. Accordingly, the LED driver 900 may be configured to receive wireless control signals from control devices (e.g., sensors) and be configured to control the LED light source 902 accordingly (e.g., turn on/off the LED light source 902, adjust one or more characteristics, such as color, color temperature, and/or intensity of the LED light source 902, etc.).

The LED driver 900 may be configured to control the amount of power delivered to the LED light source 902 in response to receiving an analog control signal $V_{CS}$, such as a 0-10V control signal, from a load control device (e.g., the load control device 120 depicted in FIG. 1). The control circuit 920 of the LED driver 900 may be configured to generate, e.g., via a link voltage communication circuit 932, a link supply voltage the control terminals C. The link supply voltage may have a magnitude of approximately 10V, for example, and may allow a current sink circuit of the load control device to generate the control signal $V_{CS}$ on control wiring 908. The control circuit 920 of the LED driver 900 may be configured to sense the control signal $V_{CS}$ and adjust an operational characteristic of the LED light source 902 based on the control signal, and a relation between the control signal $V_{CS}$ and the operational characteristic of the LED light source. For example, the control circuit 920 may be configured to adjust the target intensity of the LED light source 902 between a low-end (minimum) intensity $L_{LE}$ and a high-end (maximum) intensity $L_{HE}$ based on the control signal $V_{CS}$ and a dimming curve (e.g., a predetermined dimming curve) representing the relation between the target light intensity and the control signal $V_{CS}$.

Although the examples provided herein are described with reference to one or more light sources, the examples may be applied to other electrical loads. For example, one or more of the embodiments described herein may be used to control a variety of electrical load types, such as, for example, a motorized window treatment or a projection screen, a motorized interior or exterior shutters, a heating, ventilation, and air conditioning (HVAC) system, an air conditioner, a compressor, a humidity control unit, a dehumidifier, a water heater, a pool pump, a refrigerator, a freezer, a television or computer monitor, a power supply, an audio system or amplifier, a generator, an electric charger, such as an electric vehicle charger, and an alternative energy controller (e.g., a solar, wind, or thermal energy controller). A single control circuit may be coupled to and/or adapted to control multiple types of electrical loads in a load control system.

The invention claimed is:

1. A lighting control system for controlling a first and second light sources, the lighting control system comprising:

a first load regulation device configured to receive an analog control signal and control an intensity of the first light source based on a magnitude of the analog control signal and a first preconfigured dimming curve;

a second load regulation device configured to receive the analog control signal and control an intensity of the second light source based on the magnitude of the analog control signal and a second preconfigured dimming curve;

wherein the first load regulation device is configured to:

measure a first magnitude of the analog control signal as received at the first load regulation device;

transmit an indication signal to the second load regulation device in response to the measured first magnitude of the analog control signal; and wherein the second load regulation device is configured to:

receive the indication signal from the first load regulation device;

measure a second magnitude of the analog control signal as received at the second load regulation device; and adjust the second preconfigured dimming curve based on the measured second magnitude of the analog control signal in response to receiving the indication signal.

2. The lighting control system of claim 1, wherein the first load regulation device is configured to receive the analog control signal via an analog control link and to transmit the indication signal via the analog control link.

3. The lighting control system of claim 2, wherein the second load regulation device is configured to avoid measuring the magnitude of the analog control signal when the first load regulation device is transmitting the indication signal.

4. The lighting control system of claim 1, wherein the first load regulation device is configured to transmit the indication signal via a radio-frequency communication link.

5. The lighting control system of claim 1, wherein the first load regulation device is configured to transmit the indication signal to the second load regulation device if the measured first magnitude of the analog control signal is less than a low-end magnitude of the first preconfigured dimming curve.

6. The lighting control system of claim 1, wherein the first load regulation device is configured to determine a controlled intensity for the first light source based on the first preconfigured dimming curve and the measured first magnitude of the analog control signal, and wherein the indication signal transmitted by the first load regulation device includes the controlled intensity.

7. The lighting control system of claim 1, wherein the indication signal transmitted by the first load regulation device includes the measured first magnitude of the analog control signal.

8. The lighting control system of claim 1, wherein the first load regulation device is further configured to adjust the first preconfigured dimming curve based on the measured first magnitude of the analog control signal.

9. A lighting control system for controlling a first and second light sources, the lighting control system comprising:

a first load regulation device configured to receive an analog control signal and control an intensity of the first light source based on a magnitude of the analog control signal and a first preconfigured dimming curve;

a second load regulation device configured to receive the analog control signal and control an intensity of the second light source based on the magnitude of the analog control signal and a second preconfigured dimming curve; and a controller configured to communicate with both the first and second load regulation devices and to transmit a signal to the first and second load regulation devices to put the first and second load regulation devices into a calibration mode, wherein, during the calibration mode:

the first load regulation device is configured to:

measure a first magnitude of the analog control signal;

determine a target intensity of the first light source based on the first measured magnitude of the analog control signal and the first preconfigured dimming curve; and transmit an indication signal to the second load regulation device in response to determining the target intensity of the first light source; and the second load regulation device is configured to:

receive the indication signal from the first load regulation device;

measure a second magnitude of the analog control signal; and adjust the second preconfigured dimming curve based on the measured second magnitude of the analog control signal in response to receiving the signal from the first load regulation device.

10. The lighting control system of claim 9, wherein the first load regulation device is configured to receive the analog control signal via an analog control link and to transmit the indication signal via the analog control link.

11. The lighting control system of claim 10, wherein the second load regulation device is configured to avoid measuring the magnitude of the analog control signal when the first load regulation device is transmitting the indication signal.

12. The lighting control system of claim 9, wherein the first load regulation device is configured to transmit the indication signal via a radio-frequency communication link.

13. The lighting control system of claim 9, wherein the first load regulation device is configured to transmit the indication signal to the second load regulation device if the measured first magnitude of the analog control signal is less than a low-end magnitude of the first preconfigured dimming curve.

14. The lighting control system of claim 9, wherein the first load regulation device is configured to determine a controlled intensity for the first light source based on the first preconfigured dimming curve and the measured first magnitude of the analog control signal, and wherein the indication signal transmitted by the first load regulation device includes the controlled intensity.

15. The lighting control system of claim 9, wherein the indication signal transmitted by the first load regulation device includes the measured first magnitude of the analog control signal.

16. The lighting control system of claim 9, wherein the first load regulation device is further configured to adjust the first preconfigured dimming curve based on the measured first magnitude of the analog control signal.

17. A method of configuring one or more load regulation devices for controlling one or more light sources, the method comprising:

receiving an analog control signal at a first load regulation device;

controlling an intensity of a first light source by the first load regulation device based on a magnitude of the analog control signal and a first preconfigured dimming curve;

receiving the analog control signal at a second load regulation device;

controlling an intensity of a second light source by the second load regulation device based on the magnitude of the analog control signal and a second preconfigured dimming curve;

measuring a first magnitude of the analog control signal as received at the first load regulation device;

transmitting an indication signal from the first load regulation device to the second load regulation device in response to the measured first magnitude of the analog control signal; and receiving the indication signal from the first load regulation device at the second load regulation device;

measuring a second magnitude of the analog control signal as received at the second load regulation device; and adjusting the second preconfigured dimming curve by the second load regulation device based on the measured second magnitude of the analog control signal in response to receiving the indication signal.

* * * * *